(12) United States Patent
Davis et al.

(10) Patent No.: US 7,393,895 B2
(45) Date of Patent: Jul. 1, 2008

(54) FORMING CONCENTRATE OF POLY(ARYLENE ETHER), THERMOSETTING RESIN AND COMPATIBILIZER

(75) Inventors: Michael John Davis, Coshocton, OH (US); James Estel Tracy, Killbuck, OH (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 11/844,095

(22) Filed: Aug. 23, 2007

(65) Prior Publication Data

US 2007/0287801 A1    Dec. 13, 2007

Related U.S. Application Data

(62) Division of application No. 11/351,941, filed on Feb. 10, 2006, which is a division of application No. 09/681,941, filed on Jun. 28, 2001, now Pat. No. 7,022,777.

(51) Int. Cl.
*C08L 63/00* (2006.01)
*C08L 63/02* (2006.01)
*C08L 63/04* (2006.01)
*C08L 67/00* (2006.01)
*C08L 71/12* (2006.01)
*C08L 79/06* (2006.01)

(52) U.S. Cl. .............................. 525/58; 525/57; 525/65; 525/66; 525/68; 525/70; 525/92 B; 525/92 D; 525/95; 525/98; 525/109; 525/177; 525/184; 525/185; 525/238

(58) Field of Classification Search .................... None
See application file for complete search history.

(56) References Cited

U.S. PATENT DOCUMENTS

| | | |
|---|---|---|
| 3,306,875 A | 2/1967 | Hay |
| 3,375,298 A | 3/1968 | Fox |
| 4,054,553 A | 10/1977 | Olander |
| 4,092,294 A | 5/1978 | Bennett, Jr. et al. |
| 4,436,870 A | 3/1984 | Hinselmann et al. |
| 4,477,649 A | 10/1984 | Mobley |
| 4,477,651 A | 10/1984 | White et al. |
| 4,496,695 A | 1/1985 | Sugio et al. |
| 4,517,341 A | 5/1985 | White |
| 4,565,684 A | 1/1986 | Tibbetts et al. |
| 4,572,813 A | 2/1986 | Arakawa |
| 4,594,371 A | 6/1986 | Nauman |
| 4,623,558 A | 11/1986 | Lin |
| 4,663,230 A | 5/1987 | Tennent |
| 4,668,768 A | 5/1987 | Mendiratta et al. |
| 4,816,289 A | 3/1989 | Komatsu et al. |
| 4,853,423 A | 8/1989 | Walles et al. |
| 4,876,078 A | 10/1989 | Arakawa et al. |
| 4,888,397 A | 12/1989 | van der Meer et al. |
| 4,912,172 A | 3/1990 | Hallgren et al. |
| 4,954,195 A | 9/1990 | Turpin |
| 5,017,663 A | 5/1991 | Mizuno et al. |
| 5,024,818 A | 6/1991 | Tibbetts et al. |
| 5,043,367 A | 8/1991 | Hallgren et al. |
| 5,089,343 A | 2/1992 | Colborn et al. |
| 5,098,781 A | 3/1992 | Minnik et al. |
| 5,162,450 A | 11/1992 | Chao et al. |
| 5,165,909 A | 11/1992 | Tennent et al. |
| 5,212,239 A | 5/1993 | Mallikarjun |
| 5,213,886 A | 5/1993 | Chao et al. |
| 5,294,655 A | 3/1994 | Lee et al. |
| 5,308,565 A | 5/1994 | Weber et al. |
| 5,352,745 A | 10/1994 | Katayose et al. |
| 5,397,822 A | 3/1995 | Lee, Jr. et al. |
| 5,589,152 A | 12/1996 | Tennent et al. |
| 5,591,382 A | 1/1997 | Nahass et al. |
| 5,834,565 A | 11/1998 | Tracy et al. |
| 5,922,815 A | 7/1999 | Aycock et al. |
| 5,973,144 A | 10/1999 | Ishida |
| 6,096,821 A * | 8/2000 | Adedeji et al. ............... 524/508 |
| 6,194,495 B1 | 2/2001 | Yeager et al. |
| 6,197,898 B1 | 3/2001 | van den Berg et al. |
| 6,518,362 B1 | 2/2003 | Clough et al. |
| 6,576,718 B1 | 6/2003 | Yeager et al. |
| 6,906,120 B1 | 6/2005 | Davis et al. |

FOREIGN PATENT DOCUMENTS

| | | |
|---|---|---|
| DE | 3315803 | 10/1984 |
| EP | 0436212 | 7/1991 |
| EP | 0537005 | 4/1993 |
| EP | 0557086 | 8/1993 |
| EP | 0594228 A2 | 4/1994 |
| EP | 1167484 | 1/2002 |
| JP | 5531833 | 3/1980 |
| JP | 03174404 | 7/1991 |
| JP | 9104094 | 4/1997 |
| WO | 0125358 A1 | 4/2001 |

OTHER PUBLICATIONS

Venderbosch et al. "Processing of Intractable Polymers Using Reactive Solvents: 2. Poly(2,6-dimethyl-1,4-phenylene ether) as a Matrix Material for High Performance Composites", Polymer, Elsevier Science Ltd., vol. 36, No. 6, pp. 1167-1178 (1995).
Pearson et al., "The Preparation and Morphology of PPO-Epoxy Blends", 2296 Journal of Applied Polymer Science, 48, No. 6, pp. 1051-1060 (1993).

(Continued)

*Primary Examiner*—Robert Sellers
(74) *Attorney, Agent, or Firm*—Cantor Colburn LLP

(57) ABSTRACT

A method of forming a poly(arylene ether)-containing solid concentrate is described. The method includes blending a poly(arylene ether), a thermosetting resin, and a compatibilizing agent in the presence of a solvent to form a homogeneous solution, and removing the solvent to yield the solid concentrate. The solid concentrate is useful for preparing curable conditions.

17 Claims, No Drawings

OTHER PUBLICATIONS http://www.kwindustries.com/CoatingSystem.asp K-KLAD Coating System; Printed Jun. 25, 2007; 5 pages.
http://www.powder-coater.com/ Powder Coating Manual; Printed Jun. 25, 2007; 7 pages.
JP09-104094; Apr. 22, 1997; Human Translation (11 pages).
JP2000129086A; May 9, 2000; Machine Translation; 33 pages.
Caplus Abstracts Registry. No. 25068-38-6 for Epon 826, Copyright 2000, 4 pages.

* cited by examiner

FORMING CONCENTRATE OF POLY(ARYLENE ETHER), THERMOSETTING RESIN AND COMPATIBILIZER

CROSS REFERENCE TO RELATED APPLICATIONS

This application is a division of U.S. Nonprovisional patent application Ser. No. 11/351,941, filed Feb. 10, 2006, pending which is a division of U.S. Nonprovisional application Ser. No. 09/681,941 filed Jun. 28, 2001, now U.S. Pat. No. 7,022,777.

BACKGROUND

Curable resin compositions comprising thermosetting resins and poly(arylene ether) resins are known. However, it has been difficult to prepare thermosetting compositions comprising substantial amounts of higher molecular weight poly(arylene ether)s, for example, those having intrinsic viscosities of about 0.30 dL/g or greater (as measured at 25° C. in chloroform). As described, for example, in U.S. Pat. No. 4,912,172 to Hallgren et al., high temperatures are typically required to dissolve the poly(arylene ether)s in the thermosetting resin. High temperature, latent catalysts such as aluminum tris(acetylacetonate) can then be dissolved into the solution to initiate curing. However, the high temperatures required to prevent the poly(arylene ether) from precipitating out of solution are incompatible with the use of many cure agents, particularly amine cure agents, which would undergo a rapid and uncontrolled reaction at such elevated temperatures.

U.S. Pat. No. 4,623,558 to Lin describes a plastisol dispersion composition comprising (1) poly(phenylene oxide) in powder form, which is insoluble in the reactive plasticizer at room temperature and plasticizable at a temperature at or above the fluxing temperature; (2) a liquid reactive plasticizer member of the group consisting of (a) at least one epoxide resin having an average of more than one epoxide group in the molecule, (b) at least one liquid monomer, oligomer or prepolymer containing at least one ethylenically unsaturated group and (c) a mixture of (a) and (b); said liquid reactive plasticizer being capable of solvating the poly(phenylene oxide) at the fluxing temperature and being present in an amount ranging from 5 to 2,000 parts per 100 parts by weight of (1); and (3) 0.01 to 10% by weight of (2) of a latent curing agent, such as a thermal initiator or photoinitiator, for plasticizers present in the composition. The latent curing agents are not reactive with the thermoset resins at lower temperatures.

There remains a need for curable poly(arylene ether)-containing resin compositions that allow the poly(arylene ether) to remain in a workable state in the thermosetting resin at a temperature suitable for addition of a low-temperature cure agent. There also remains a need for curable poly(arylene ether)-containing resin compositions that form homogeneous solutions at lower temperature for intimate mixing of the poly(arylene ether) into the resin matrix.

BRIEF SUMMARY

One embodiment is a curable resin composition comprising: about 5 to about 50 parts by weight of a poly(arylene ether); about 25 to 90 parts by weight of a thermosetting resin selected from the group consisting of epoxy resins, polyester resins, polyimide resins, bis-maleimide resins, cyanate ester resins, vinyl resins, benzoxazine resins, benzocyclobutene resins, and mixtures comprising at least one of the foregoing thermosetting resins; about 0.5 to about 15 parts by weight a compatibilizing agent selected from the group consisting of polyvinyl acetal resins, styrene-butadiene-styrene (SBS) block copolymers, styrene ethylene styrene (SES) block copolymers, styrene-ethylene-butylene-styrene (SEBS) block copolymers, functionalized butadiene-acrylonitrile copolymers, styrene-butadiene core shell rubbers, styrene-butadiene-styrene core shell rubbers, and mixtures comprising at least one of the foregoing compatibilizing agents; and about 3 to about 150 parts by weight per 100 parts of weight of the thermosetting resin of an amine cure agent selected from the group consisting of amidoamines, polyamides, cycloaliphatic amines, modified cycloaliphatic amines, aromatic amines, modified aromatic amines, $BF_3$-amine adducts, imidazoles, guanidines, arylene polyamines, and mixtures comprising at least one of the foregoing amine cure agents; wherein the parts by weight of the poly(arylene ether), the thermosetting resin, and the compatibilizing agent sum to 100.

Another embodiment is a cured resin composition comprising the reaction product of the above curable resin composition.

Another embodiment is an article comprising the above cured resin composition.

Another embodiment is a method of preparing a curable resin composition, comprising: forming an intimate blend comprising about 5 to about 50 parts by weight of a poly(arylene ether); about 25 to 90 parts by weight of a thermosetting resin selected from the group consisting of epoxy resins, polyester resins, polyimide resins, bis-maleimide resins, cyanate ester resins, vinyl resins, benzoxazine resins, benzocyclobutene resins, and mixtures comprising at least one of the foregoing thermosetting resins; about 0.5 to about 15 parts by weight of a compatibilizing agent selected from the group consisting of polyvinyl acetal resins, styrene-butadiene-styrene block copolymers, styrene-ethylene-styrene block copolymers, styrene-ethylene-butylene-styrene block copolymers, functionalized butadiene-acrylonitrile copolymers, styrene-butadiene core shell rubbers, styrene-butadiene-styrene core shell rubbers, and mixtures comprising at least one of the foregoing compatibilizing agents; and about 3 to about 150 parts by weight per 100 parts by weight thermosetting resin of an amine cure agent selected from the group consisting of amidoamines, polyamides, cycloaliphatic amines, modified cycloaliphatic amines, aromatic amines, modified aromatic amines, $BF_3$-amine adducts, imidazoles, guanidines, arylene polyamines, and mixtures comprising at least one of the foregoing amine cure agents; wherein the parts by weight of the poly(arylene ether), the thermosetting resin, and the compatibilizing agent sum to 100.

Another embodiment is a method of preparing a poly(arylene ether)-containing solid concentrate, comprising: blending about 30 to about 90 parts by weight of a poly(arylene ether) and about 10 to about 70 parts by weight of a thermosetting resin in the presence of a suitable solvent to form a homogeneous solution; and substantially removing the suitable solvent to yield a solid concentrate; wherein the parts by weight of the poly(arylene ether) and the thermosetting resin sum to 100.

Another embodiment is a poly(arylene ether)-containing solid concentrate prepared according to the above method.

Another embodiment is a method of forming a poly(arylene ether)-containing solid concentrate, comprising: blending about 30 to about 86 parts by weight of a poly(arylene ether), about 10 to about 70 parts by weight of a thermosetting resin, and about 4 to about 8 parts by weight of a compatibilizing agent in the presence of a solvent to form a homogeneous solution; and substantially removing the solvent to yield a solid concentrate; wherein the parts by weight of the poly(arylene ether), the thermosetting resin, and the compatibilizing agent sum to 100.

Another embodiment is a method of forming a poly(arylene ether)-containing solid concentrate, comprising: blending about 30 to about 76 parts by weight of a poly(arylene ether), about 20 to about 70 parts by weight of a thermosetting resin, and about 4 to about 6 parts by weight of a compatibilizing agent in the presence of a solvent to form a homogeneous solution; and removing at least 95 weight percent of the solvent to yield a solid concentrate; wherein the parts by weight of the poly(arylene ether), the thermosetting resin, and the compatibilizing agent sum to 100; wherein the poly(arylene ether) is a homopolymer comprising 2,6-dimethylphenylene ether units, or a random copolymer comprising 2,6-dimethylphenylene ether units in combination with 2,3,6-trimethyl-1,4-phenylene ether units; wherein the thermosetting resin comprises an epoxy resin; wherein the compatibilizing agent comprises a polyvinyl acetal; and wherein the homogeneous solution consists of the poly(arylene ether), the thermosetting resin, the compatibilizing agent, and the solvent.

DETAILED DESCRIPTION OF THE PREFERRED EMBODIMENTS

One embodiment is a curable resin composition comprising: about 5 to about 50 parts by weight of a poly(arylene ether); about 25 to 90 parts by weight per 100 parts by weight of a thermosetting resin selected from the group consisting of epoxy resins, polyester resins, polyimide resins, bis-maleimide resins, cyanate ester resins, vinyl resins, benzoxazine resins, benzocyclobutene resins, and mixtures comprising at least one of the foregoing thermosetting resins; about 0.5 to about 15 parts by weight per 100 parts by weight of a compatibilizing agent selected from the group consisting of polyvinyl acetal resins, styrene-butadiene-styrene (SBS) block copolymers, styrene ethylene styrene (SES) block copolymers, styrene-ethylene-butylene-styrene (SEBS) block copolymers, functionalized butadiene-acrylonitrile copolymers, styrene-butadiene core shell rubbers, styrene-butadiene-styrene core shell rubbers, and mixtures comprising at least one of the foregoing compatibilizing agents; and about 3 to about 150 parts by weight per 100 parts of weight of the thermosetting resin of an amine cure agent selected from the group consisting of amidoamines, polyamides, cycloaliphatic amines, modified cycloaliphatic amines, aromatic amines, modified aromatic amines, $BF_3$-amine adducts, imidazoles, guanidines, arylene polyamines, and mixtures comprising at least one of the foregoing amine cure agents; wherein the parts by weight of the poly(arylene ether), the thermosetting resin, and the compatibilizing agent sum to 100.

It has unexpectedly been discovered that the use of the compatibilizing agent in the above composition allows the poly(arylene ether) to remain finely dispersed in the thermosetting resin at temperatures suitable for the use of amine cure agents. While not wishing to be bound by any particular hypothesis, the present inventors believe that their invention may function as follows. The thermosetting resin may act as a solvent for the poly(arylene ether), dissolving it to form a homogeneous solution at elevated temperature. In the absence of the compatibilizing agent, cooling of the solution leads to precipitation of the poly(arylene ether) in large, non-homogeneous solid aggregates, including crystalline portions in some cases, forming an intermediate composition unsuitable for further addition of catalysts or hardeners. Addition of the compatibilizing agents prior to cooling the solution appears to inhibit crystallization and formation of intractable aggregates, and it allows formation of a finely divided dispersion that is workable at temperatures suitable for the use of amine curing agents.

In addition, it has been discovered that the compatibilizing agent may be used to prepare poly(arylene ether)-containing solid concentrates. For example, a solvent such as toluene may be used to form a solution containing the poly(arylene ether), the compatibilizing agent, and the thermosetting resin. Removal of solvent from this solution creates a solid concentrate in the form of a stable powder that may be dissolved readily into additional thermoset resin, catalyzed, and cured. It has been possible to prepare solid concentrates with a wide range of poly(arylene ether) concentrations for maximum flexibility in formulating. For example, concentrates having high concentrations of poly(arylene ether) may be diluted with additional thermosetting resin, and concentrates having lower concentrations of poly(arylene ether) may be melted and used directly.

Suitable poly(arylene ether) resins comprise a plurality of structural units of the formula

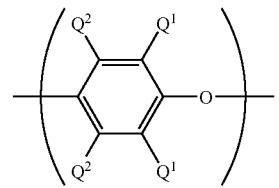

wherein for each structural unit, each $Q^1$ is independently halogen, primary or secondary $C_1$-$C_7$ alkyl, phenyl, $C_1$-$C_7$ haloalkyl, $C_1$-$C_7$ aminoalkyl, $C_1$-$C_7$ hydrocarbonoxy, or $C_2$-$C_7$ halohydrocarbonoxy wherein at least two carbon atoms separate the halogen and oxygen atoms; and each $Q^2$ is independently hydrogen, halogen, primary or secondary $C_1$-$C_7$ alkyl, phenyl, $C_1$-$C_7$ haloalkyl, $C_1$-$C_7$ aminoalkyl, $C_1$-$C_7$ hydrocarbonoxy, or $C_2$-$C_7$ halohydrocarbonoxy wherein at least two carbon atoms separate the halogen and oxygen atoms. Examples of suitable primary $C_1$-$C_7$ alkyl groups are methyl, ethyl, n-propyl, n-butyl, isobutyl, n-pentyl, isopentyl, 2-methylbutyl, n-hexyl, 2,3-dimethylbutyl, 2-, 3-, or 4-methylpentyl, and the corresponding heptyl groups. Examples of secondary $C_1$-$C_7$ alkyl groups are isopropyl, sec-butyl and 3-pentyl. Preferably, any alkyl radicals are straight chain rather than branched. Preferably, each $Q^1$ is $C_1$-$C_7$ alkyl or phenyl, especially $C_1$-$C_7$ alkyl, and each $Q^2$ is hydrogen.

Both homopolymer and copolymer poly(arylene ether) polymers are included. The preferred homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether) polymers containing moieties prepared by grafting vinyl monomers or polymers such as poly(styrene), as well as coupled poly(arylene ether) polymers in which coupling agents such as low molecular weight polycarbonates, quinones, heterocycles and formals undergo reaction in a known manner with the hydroxy groups of two poly(arylene ether) chains to produce a higher molecular weight polymer. Poly(arylene ether) polymers of the composition further include combinations of any of the above. Many suitable random copolymers, as well as homopolymers, are disclosed in the patent literature. Reference is made to U.S. Pat. Nos. 4,054,553 to Olander, 4,092,294 to Bennett, Jr. et al., 4,477,649 to Mobley, 4,477,651 to White et al., and 4,517,341 to White.

The poly(arylene ether) resin is typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful poly(arylene ether) resins are those having terminal hydroxy groups and a number average molecular weight of about 8,000 to about 13,000 atomic mass units (amu), preferably about 9,000 to about 12,000 amu, more preferably about 10,000 to about 11,000 amu, as determined by gel permeation chromatography using polystyrene standards. The poly(arylene ether) resin accordingly may have an intrinsic viscosity (I.V.) of about 0.20 to about 0.40 deciliters per gram (dL/g), preferably about 0.25 to about 0.35 dL/g, more preferably about 0.28 to about 0.32 dL/g, as measured in chloroform at 25° C. Such poly(arylene ether)s may be synthesized directly or obtained by subjecting poly(arylene ether)s to redistribution. Suitable methods for redistribution are described in, for example, U.S. Pat. No. 5,834,565. In one procedure, low molecular weight poly(arylene ether)s are prepared from poly(arylene ether)s typically having a number average molecular weight of about 15,000 to 25,000 amu. Such preparation of a low molecular weight poly(arylene ether) resin can be accomplished by reacting the poly(arylene ether) resin with an oxidizing agent such as a peroxide or a quinone, with or without a phenol. Another procedure is to obtain a low molecular weight poly(arylene ether) resin by oxidative coupling as described above to produce resins of the desired number average molecular weight which is isolated, preferably, by a direct isolation method. However, even such low molecular weight resins can optionally be functionalized with a peroxide or peroxide and a phenol to achieve even lower molecular weight.

Phenolics useful in the redistribution reaction described herein include all known phenol compounds, including those having the formula

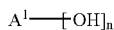

wherein $A^1$ is any aromatic, mixed aliphatic aromatic hydrocarbon, heterocycle or derivative of the like, -OH is a hydroxy residue, and n is an integer from 1 to about 10, preferably from 1 to about 5. A particularly preferred phenolic is 2,2-bis(4-hydroxyphenyl) propane.

In general, any peroxide would be useful in the redistribution reaction, including those having the formula $A^2$-O—O-$A^3$ wherein $A^2$ and $A^3$ are any aliphatic acyl, aromatic acyl group, alkyl, or mixed aliphatic aromatic hydrocarbon, hydrogen or inorganic ester moiety or derivatives of the like. Typical peroxides include without limitation: 1) diacyl peroxides such as dibenzoyl peroxide, 4,4'-di-t-butylbenzoyl peroxide or other aryl substituted derivatives, dilauryl peroxide, acetyl benzoyl peroxide, acetyl cyclohexylsulfonyl peroxide and diphthaloyl peroxide; 2) peroxydicarbonates such as dicetylperoxydicarbonate; 3) peroxyacids such as perbenzoic acid, 3-chloroperbenzoic acid, 4-nitroperbenzoic acid, and other substituted derivatives of perbenzoic acid, peroxyacetic acid, peroxypropanoicacid, peroxybutanoic acid, peroxynonanoic acid, peroxydodecanoic acid, diperoxyglutaric acid, diperoxyadipic acid, diperoxyoctanedioic acid, diperoxynonanedioic acid, diperoxydecanedioic acid, diperoxydoecandioic acid, monoperoxyphthalic acid, as well as the inorganic acids such as peroxysulfuric acid, peroxydisulfuric acid, peroxyphosphoric acid, peroxydiphosphoric acid and their corresponding salts; and 4) peroxycarboxylic esters such as t-butyl performate, t-butyl peracetate, t-butyl peroxyisobutyrate, t-butyl perbenzoate, cumyl perbenzoate, t-butyl peroxynonanoate, t-butyl monoperoxymaleate, t-butyl monoperoxyphthalate, di-t-butyl diperoxyadipates, and 2,5-dimethyl 2,5-bis(benzoylperoxy)hexane.

These peroxides may be used alone or in combination with or without the presence of a catalyst to induce decomposition of the peroxide and increase the rate of radical production. Other oxidizing agents known in the art include quinones such as 2,2',6,6'-tetramethyl diphenoquinone (TMDQ) may also be used in the presence or absence of a phenol.

The composition may comprise the poly(arylene ether) in an amount of about 5 to about 50 parts by weight per 100 parts by weight total of the poly(arylene ether), the thermosetting resin, and the compatibilizing agent. Within this range, it may be preferred to use at least about 10 parts by weight, more preferably at least about 15 parts by weight, of the poly(arylene ether). Also within this range, it may be preferred to use up to about 40 parts by weight, more preferably up to about 30 parts by weight, of the poly(arylene ether).

The curable composition further comprises a thermosetting resin selected from epoxy resins, polyester resins, polyimide resins, bis-maleimide resins, cyanate ester resins, vinyl resins, benzoxazine resins, benzocyclobutene resins, mixtures comprising at least one of the foregoing thermosetting resins, and the like. The thermosetting resin may be present in its monomeric, oligomeric, or polymeric state and may further include reaction products with art-known cure agents and catalysts.

The epoxy resin useful in this invention would include, in its broadest sense, any epoxy compound. Suitable epoxy compounds useful in this formulation may have the formula

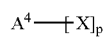

wherein $A^4$ is any aromatic, aliphatic, mixed aliphatic aromatic hydrocarbon, heterocycle or derivative of the like; X is an epoxy containing residue; and p is any integer, preferably from 1 to about 100, more preferably 2 to about 100.

When flame retardance is required, it is preferred that the epoxide comprise at least two epoxy compounds, one being brominated to provide flame retardancy and the other at levels sufficient to provide a total bromine content of about 10 to about 30 weight percent, based on the weight of the solid composition. Preferred epoxy compounds include those wherein p is 1 to 4, more preferably those wherein p is 2.

Typical epoxy resins include diepoxides having the formula

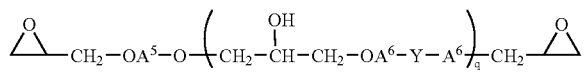

wherein $A^5$ and $A^6$ are aromatic radicals, Y is a single bond or a divalent radical, and q is an integer from 0 to about 500. The radicals $A^5$ and $A^6$ may be substituted or unsubstituted with typical groups chosen from aryl, alkyl, alkoxy, halogen, and the like. Y may include divalent radicals such as alkylene, cycloalkylene, arylene, oxy, thio, sulfonyl, sulfoxy, and carbonyl.

Common examples of the above diepoxide compounds include diglycidyl ethers often produced by the condensation of epichlorohydrin with a bisphenol where q=0. Typical of this class of compounds are the diglycidyl ethers of 4,4'-(1-methylethylidene) diphenol, 4,4'-(1-methylethylidene)bis(2-methylphenol), 4,4'-(1-methylethylidene)bis(2,6-dimethylphenol), 4,4'-(1,1-cyclopentylidene)diphenol, 4,4'-(cyclohexylidene)diphenol, 4,4'-(1-methylethylidene)bis(2,6-dibromo phenol),4,4'-methylenediphenol, 4,4'-(1-methylethylidene)bis(2-allylphenol), 4,4'-(1-methylethylidene)bis(2-t-butyl-5-methylphenol), 4,4'-(1-methylethylidene)bis(2-t-butyl-5-methylphenol), 4,4'-(1-methylpropylidene)bis(2-t-butyl-5-ethylphenol), 4,4'-(1,4-bis(methylethylidene)phenyl)bis(2-t-butyl-5-methylphenol), 4,4'-biphenol, hydroquinone, resorcinol, and the like. Oligomeric products generated during this condensation reaction are also known and are useful. Such compounds are exemplified by the oligomeric condensation product of bisphenol A and epichlorohydrin sold by Shell Corporation under the tradename EPON® as EPON® 825 (q=0) and EPON® 828 (q=0.14).

Typical epoxy resins further include the reaction products of the above diepoxides with bisphenols, commonly referred to as upstaged resins. A typical example includes the condensation product of bisphenol A diglycidyl ether with tetrabromobisphenol A. The partial condensation products suitable for use may be prepared by heating the mixture of compounds, as hereinabove described, at a temperature in the range of about 50° C. to about 225° C., preferably about 70° C. to about 200° C., more preferably about 100° C. to about 190° C., in the presence of a catalytic amount of at least one basic reagent, such as copper (for instance lithium dimethylcuprate), amine, phosphine, or metal salt with a strong alkoxide counter ion.

The triarylphosphines, especially triphenylphosphine, are the preferred basic reagents for the bisphenol bisepoxide condensation reaction for their effectiveness at low levels, their low tendency to cause side reactions, and their harmlessness when they remain present after the reaction is complete. They are usually employed in the amount of about 0.1% to about 0.5% by weight. The reaction is preferably conducted in an inert atmosphere such as nitrogen, especially when a triarylphosphine is employed as a catalyst.

Typical epoxy resins further include multifunctional epoxides as described by the formula

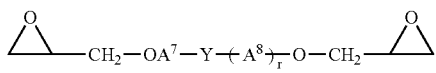

wherein Y is as defined above; $A^7$ and $A^8$ are aromatic radicals either substituted or unsubstituted with typical substituting groups chosen from aryl, alkyl, alkoxy, halo, and the like; and r is an integer from 0 to about 500. The materials described by this formula include all epoxidized phenolic resins including epoxidized novolacs and resols. Most common examples of compounds described by this formula include glycidyl ethers produced by the condensation of epichlorohydrin with a phenolic resin. Examples of this class of compounds include the glycidyl ethers of phenol formaldehyde novolac, cresol formaldehyde novolac, bromophenol formaldehyde novolac, t-butylphenol formaldehyde novolac, phenolic resins derived from the condensation of phenol with a diene or mixtures of dienes, such as dicyclopentadiene or butadiene, or additionally, with a polybutadiene resin.

Other multifunctional epoxides include phloroglucinol triglycidyl ether and tetrakis(glycidoxyphenyl) ethane.

Typical epoxy resins further include glycidyl ethers of amines, amides, or nitrogen containing heterocycles. These materials may include triglycidylcyanurate, triglycidylisocyanurate, N,N,N'N'-tetraglicidyldiaminodiphenylmethane, N,N,-O-triglycidyl-4-aminophenol, N,N-diglycidyl aniline, and N,N-diglycidyl hydantoin.

Typical epoxy resins further include glycidyl ethers of carboxylic acids such as diglycidyl phthalate, diglycidyl tetrahydrophthalate, diglycidyl hexahydrophthalate and diglycidyl adipate.

Typical epoxy resins further include homopolymers or copolymers prepared from unsaturated epoxides such as glycidyl acrylate, glycidyl methacrylate and allyl glycidyl ether. As mentioned, these materials may be used as homopolymers or copolymers obtained from mixtures of the unsaturated epoxides mentioned above or mixtures of unsaturated epoxides and other vinyl monomers known in the practice of vinyl polymerization.

Typical epoxy resins further include polysiloxanes containing epoxy functionality such as the glycidyl ether of 1,3-bis(3-hydroxypropyl)tetramethyldisiloxane.

Typical epoxy resins further include compounds prepared by epoxidation of alkenes, dienes or polyenes, such as phenylglycidyl ether, allylglycidyl ether, napthylglycidyl ether, 3,4-epoxycyclohexylmethyl 3,4-epoxycyclohexane carboxylate, vinylcyclohexene dioxide, and substituted derivatives thereof. In addition, epoxidized polyenes such as polybutadiene resins or butadiene containing copolymers would be useful.

In one embodiment, the thermosetting resin may comprise an epoxy-functionalized dihydric phenol, such as bisphenol polyglycidyl ethers derived from 2,2-bis(4-hydroxyphenyl) propane (bisphenol A) or bis(2-hydroxyphenyl)methane (bisphenol F).

Other useful thermosetting components comprise vinylic compounds, including triallylisocyanurate, triallylcyanurate, diallyl phthalate, diallyl isophthalate, diallyl maleate, diallyl fumarate, diethylene glycol dialkylcarbonate, trialkyl phosphate, ethylene glycol diallyl ether, allyl ethers of trimethylolopropane, partial allyl ethers of pentaerythritol, diallyl sebacate, alkylated novolacs, alkylated resol resins, and/or cyanate esters. These various thermosetting resins can be used either individually or in combination with one another. Examples of vinyl thermosetting resins include those known in the art, such as those described in S. H. Goodman, "Handbook of Thermoset Plastics", Noyes Publications (1986).

Cyanate esters include those having the formula

wherein $A^9$ is any aromatic, aliphatic, mixed aliphatic aromatic hydrocarbons, heterocycles or derivatives of the like, X is a cyanate group, and s is an integer from 1 to 10 and preferably from 1 to 4. Typical of this class of compounds are those derived from the reaction of cyanogen halides with the bisphenols described above. Various examples of cyanate esters can be found in I. Hamerton, "Chemistry and Technology of the Cyanate Esters", Chapman Hall (1994).

Polyimides, including bismaleimides, include those known in the art, such as those described in D. Wilson, H. D. Stenzenberger and P. M. Hergenrother, "Polyimides", Chapman Hall (1990).

Benzoxazines include those known to the art, such as those described in U.S. Pat. No. 5,973,144 to Ishida.

The composition may comprise the thermosetting resin in an amount of about 25 to about 90 parts by weight per 100 parts by weight total of the poly(arylene ether), the thermosetting resin, and the compatibilizing agent. Within this range, it may be preferred to use at least about 50 parts by weight, more preferably at least about 60 parts by weight, of the thermosetting resin. Also within this range, it may be preferred to use up to about 85 parts by weight of the thermosetting resin.

The composition further comprises a compatibilizing agent to keep poly(arylene ether) in a fine, dispersed, and workable state. Compatibility is meant to include the stabilization of the composition against gross phase separation. Indicators of improved compatibilization include, for example, increased ductility and improved phase morphology stabilization. Improved compatibility of the blend components contributes to the desirable physical properties of the curable resin composition.

Preferred compatibilizing agents include polyvinyl acetal resins, including copolymers of polyvinyl butyral and other vinyl monomers such as vinyl acetate, and partially hydrolyzed derivatives therefrom. The term "polyvinyl butyral" encompasses such copolymers. An example of such a polyvinyl butyral is poly(vinyl butyral-co-polyvinyl alcohol-co-polyvinyl acetate). Of particular utility is a polyvinyl butyral resin of molecular weight 50,000 to 120,000, available from Solutia under the trademark BUTVAR®. Other compatibilizing agents include, for example, low molecular weight thermoplastic elastomers known in the art, such as styrene-butadiene-styrene (SBS) block copolymers, styrene-ethylene-styrene (SES) block copolymers, styrene-ethylene-butylene-styrene (SEBS) block copolymers and functionalized butadiene-acrylonitrile copolymers such as those sold under the tradename HYCAR® Reactive Liquid Rubbers by B. F. Goodrich Company. Also included are core shell type toughening agents such as styrene-butadiene and styrene-butadiene-styrene core shell rubbers. Other useful materials may be found in W. Hofmann and C. Hanser, "Rubber Technology Handbook", Verlag Publishers (1989); and B. Ellis, "Chemistry and Technology of the Epoxy Resins", Chapman Hall (1993).

The composition may comprise the compatibilizing agent in an amount of about 0.5 to about 15 parts by weight per 100 parts by weight total of the poly(arylene ether), the thermosetting resin, and the compatibilizing agent. Within this range, it may be preferred to use at least about 2 parts by weight, more preferably at least about 3 parts by weight, of the compatibilizing agent. Also within this range, it may be preferred to use up to about 10 parts by weight, more preferably up to about 8 parts by weight, of the compatibilizing agent.

The composition further comprises a cure agent to effect crosslinking between the reactive thermosetting components. For the purpose of this invention, the term cure agent is meant to include curing catalysts and co-catalysts. Any known cure agent suitable for the desired application may be employed. Suitable cure agents are described, for example, in B. Ellis, "Chemistry and Technology of the Epoxy Resins", Chapman Hall (1993).

Preferred cure agents include amine cure agents, such as amidoamines, polyamides, cycloaliphatic amines, modified cycloaliphatic amines, aromatic amines, modified aromatic amines, $BF_3$-amine adducts, imidazoles, guanidines, arylene polyamines, mixtures comprising at least one of the foregoing amine cure agents, and the like.

Particularly useful imidazoles are imidazole, 1,2-dimethylimidazole, 2-methylimidazole, 2-heptadecylimidazole and 1-(2-cyanoethyl)-2-phenylimidazole.

uitable guanidines may be represented by the formula

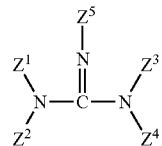

wherein $Z^1$ and $Z^3$ independently represent a $C_1$-$C_4$ alkyl group, and $Z^2$, $Z^4$, and $Z^5$ independently represent hydrogen or a $C_1$-$C_4$ alkyl group.

Particularly useful cure agents include arylene polyamines with alkyl substitution on the aromatic ring. Highly preferred cure agents include 4,4'-methylenebis[2,6-diethylaniline] (MDEA), and diethyltoluenediamine (DETDA).

Examples of cure agents further include metal carboxylates wherein the metal is zinc, magnesium or aluminum, and the carboxylate is a $C_{1-24}$ carboxylate such as acetate, octoate, or stearate. Other suitable cure agents include aluminum and zinc salts of diketones of the formula

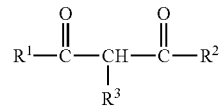

wherein each of $R^1$ and $R^2$ is a $C_{1-20}$ alkyl or aryl and $R^3$ is hydrogen or $C_1$-$C_{20}$ alkyl or aryl; preferably, $R^1$ and $R^2$ are methyl, and $R^3$ is hydrogen.

The amount of cure agent employed may vary according to the cure agent equivalent weight and the thermosetting resin type and amount. The composition may typically comprise the cure agent in an amount of about 3 to about 150 parts by weight per 100 parts by weight of the thermosetting resin. Within this range, it may be preferred to use at least about 20 parts by weight, more preferably at least about 30 parts by weight, of the cure agent. Also within this range, it may be preferred to use up to about 100 parts by weight, more preferably to about 60 parts by weight, of the cure agent.

The curable resin composition may, optionally, further comprise a plasticizer to reduce the brittleness of cured substrates. When used in appropriate quantities, these plasticizers reduce the glass transition temperature of the poly(arylene ether) less than 1° C. per part poly(arylene ether) without severely affecting the glass transition temperature of the remaining thermosetting components. Suitable plasticizers are known and include, for example, resorcinol diphosphate, bisphenol-A-diphosphate and isopropylated phenol phosphate. When present, the plasticizer may be used at about 0.1 to about 20 parts by weight per 100 parts by weight of the poly(arylene ether). Within this range, it may be preferred to use at least about 0.5 part by weight, more preferably at least about 1 part by weight, of the plasticizer. Also within this range, it may be preferred to use up to about 10 parts by weight, more preferably up to about 3 parts by weight, of the plasticizer.

The curable resin composition may further optionally comprise various additives, for example, antioxidants, UV absorbers, stabilizers such as light stabilizers and others, lubricants, pigments, dyes, colorants, anti-static agents, flame retardants, impact modifiers, mold release agents, and the like, and mixtures thereof. Selection of types and amounts of such additives may be performed without undue experimentation by those skilled in the art. Exemplary antioxidants include organophosphites, for example, tris(nonyl-phenyl) phosphite, tris(2,4-di-t-butylphenyl)phosphite, bis(2,4-di-t-butylphenyl)pentaerythritol diphosphite, 2,4-di-tert-butylphenyl phosphite, or distearyl pentaerythritol diphosphite; alkylated monophenols, polyphenols and alkylated reaction products of polyphenols with dienes, such as, for example, tetrakis[methylene(3,5-di-tert-butyl-4-hydroxyhydrocinnamate)]methane and 3,5-di-tert-butyl-4-hydroxyhydrocinnamate octadecyl; butylated reaction products of para-cresol and dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds, such as, for example, distearylthiopropionate, dilaurylthiopropionate, ditridecylthiodipropionate; and amides of beta-(3,5-di-tert-butyl-4-hydroxyphenyl)propionic acid.

Flame retardant additives include both reactive and non-reactive flame retardant additives such as tetrabromobisphenol A derivatives, including the bis(2-hydroxyethyl)ether of tetrabromobisphenol A, the bis(3-acryloyloxy-2-hydroxypropyl) ether of tetrabromobisphenol A, the bis(3-methacryloyloxy-2-hydroxypropyl) ether of tetrabromobisphenol A, the bis(3-hydroxypropyl) ether of tetrabromobisphenol A, the bis(2,3-dibromopropyl) ether of tetrabromobisphenol A, the diallyl ether of tetrabromobisphenol A, and the bis(vinylbenzyl) ether of tetrabromobisphenol A; pentabromobenzyl acrylate; dibromostyrenes; tribromostyrenes; tetrabromocyclooctanes; dibromoethyldibromocyclohexanes such as 1,2-dibromo-4-(1,2-dibromoethyl)-cyclohexane; ethylene-bis-tetrabromophthalimide; hexabromocyclododecanes; tetrabromophthalic anhydrides; brominated diphenylethers such as decabromodiphenyl ether; poly(2,6-dibromophenylene ether); and tris(2,4,6-tribromophenoxy-1,3,5-triazine; as well as phosphorus-containing additives, for example, the phosphorous-containing additives described above and those described in R. Gachter and H. Muller (eds.), P. P. Klemchuck (assoc. ed.), "Plastic Additives Handbook, $4^{th}$ Edition", Hansen Publishers, (1993). Such additives are typically used in concentrations of about 12 to about 20 weight percent of the brominated additive, or about 15 to about 25 weight percent of the phosphorous-containing additive. Flame retardance may also be imparted to the compositions by the inclusion of brominated thermosetting resins, for example a brominated poly(epoxide), or a poly(arylene ether) having a phosphorous-containing moiety in its backbone.

Other art-known modifiers, fillers, antioxidants, UV absorbers, stabilizers, lubricants, plasticizers, pigments, dyes, colorants, anti-static agents, mold release agents, and flame retardants may also be used in the present invention such as those described in R. Gachter and H. Muller (eds.), P. P. Klemchuck (assoc. ed.), "Plastic Additives Handbook, $4^{th}$ Edition", Hansen Publishers, (1993).

Fillers may also be added optionally to the adhesive compositions to modify product characteristics. Suitable fillers include but are not limited to silicates, titanium dioxide, fibers, glass fibers (including continuous and chopped fibers), carbon black, graphite, calcium carbonate, talc, and mica. Preferred conductive fillers include vapor-grown carbon fibers, such as those having an average diameter of about 3.5 to about 500 nanometers as described in, for example, U.S. Pat. Nos. 4,565,684 and 5,024,818 to Tibbetts et al.; 4,572,813 to Arakawa; 4,663,230 and 5,165,909 to Tennent; 4,816,289 to Komatsu et al.; 4,876,078 to Arakawa et al.; 5,589,152 to Tennent et al.; and 5,591,382 to Nahass et al. Suitable filler types and amounts are dictated by the desired end application and may be determined without undue experimentation.

The preparation of the curable resin composition may be achieved by merely blending the components under conditions suitable for the formation of an intimate blend. During mixing, the blend is preferably sufficiently heated such that the components are in solution, thereby enabling intimate mixing. Such conditions include mixing components in a vessel capable of heating and shearing action to thoroughly dissolve and blend all components.

In one embodiment, the composition is prepared using a thermoset resin in its liquified (i.e., melted) state as a solvent. No additional solvents are employed. In this embodiment, a compatibilizer, a poly(arylene ether), and, optionally, a plasticizer, are dissolved in the thermoset resin with heating. Depending on the cure agent employed, the cure agent may be added immediately or after cooling the solution to a temperature low enough to prevent premature curing. For example, addition of the cure agent MDEA is preferably conducted after cooling the solution to a temperature up to about 100° C., preferably a temperature up to about 90° C. Depending on the molecular weight and degree of functionalization of the poly (arylene ether), such cooling may be accompanied by conversion of the solution to a fine dispersion. The particles in the dispersion may have particle sizes up to about 1 millimeter, more commonly up to about 100 microns. Addition of the cure agent, such as, for example, MDEA or DETDA, typically creates a homogeneous solution.

In one embodiment, at least 50 weight percent, preferably at least 90 weight percent, of the total poly(arylene ether) is supplied to the composition as a solid concentrate further comprising the thermosetting resin. This method is very convenient because poly(arylene ether) provided as such a solid concentrate dissolves much more easily in thermosetting resin than does pure poly(arylene ether). In this embodiment, the polyarylene ether and thermosetting resin are dissolved in a suitable solvent, with heating as needed. Suitable solvents may include alcohols, ketones, aliphatic hydrocarbons, aromatic hydrocarbons, chlorohydrocarbons, nitrohydrocarbons, ethers, esters, amides, mixed ether-esters, sulfoxides, mixtures comprising at lease one of the foregoing solvents, and the like. Preferred solvents include aromatic hydrocarbons, such as benzene, toluene, and xylenes, and toluene is highly preferred. The solvent is then substantially removed (i.e., at least about 90 weight percent, preferably at least about 95 weight percent, more preferably at least about 99 weight percent of the solvent is removed) to form a powdered solid concentrate. For example, when the thermosetting resin is the epoxy EPON® 828, and the poly(arylene ether) is a directly isolated or redistributed poly(arylene ether) having an intrinsic viscosity of about 0.30 dL/g, the solid concentrate may comprise about 30 to about 86 weight percent poly(arylene ether), about 10 to about 70 weight percent epoxy resin, and about 4 to about 8 weight percent compatibilizing agent, based on the total weight of the solid concentrate. When the epoxy resin content of the solid concentrate exceeds about 70 weight percent, the solid concentrate may become sticky and difficult to handle. When the poly(arylene ether) content of the solid concentrate is less than about 30 weight percent, the concentrate becomes an inefficient means of delivering the poly(arylene ether). A preferred solid concentrate may comprise about 30 to about 76 weight percent poly(arylene ether), about 20 to about 70 weight percent thermosetting resin, and about 4 to about 6 weight percent compatibilizing agent, based on the total weight of the solid concentrate. Additional components may conveniently be added to the solid concentrate by dry blending.

Preparation of the poly(arylene ether)-containing solid concentrates may further include reducing the intrinsic viscosity (reducing the molecular weight) of the poly(arylene ether) via a redistribution reaction, as described above. Redistribution reactions may be used, for example, to convert a poly(arylene ether) having an intrinsic viscosity of at least about 0.40 dL/g to a poly(arylene ether) having an intrinsic viscosity up to about 0.35 dL/g, preferably up to about 0.30 dL/g.

The above described compositions and methods are useful to increase the ductility and toughness of cured resins. The composition may be used to form articles by techniques including pultrusion, casting, and resin transfer molding.

The invention is further illustrated by the following non-limiting examples.

COMPARATIVE EXAMPLE 1

This comparative example illustrates the preparation and properties of a composition comprising an epoxy resin and cure agent, but no poly(arylene ether). One hundred parts of 2,2-bis(4-hydroxyphenyl)propane-epichlorohydrin copolymer, obtained under the trade name EPON® 828 from Shell Oil Co., were charged into a flask with stirring. After the epoxide was heated to 90° C. with continued stirring, 46 parts by weight of cure agent methylene-bis-diethylaniline (4,4'-methylenebis(2,6c-diethylaniline); MDEA; CAS Registry No. 13680-35-8; obtained as ETHACURE® 208 from Ethyl Corporation) was added. The resulting homogeneous solution was poured into open bar molds, and cured for about 2 hours at 100° C. and 4 hours at 175° C. Molded parts were evaluated for Z-axis expansion (30° C.-260° C.; according to ASTM D6341) and $K_1C$ fracture toughness (according to ASTM D5045). The composition and properties are summarized in the Table below.

EXAMPLES 1 AND 2

These examples illustrate preparation of compositions comprising a directly isolated poly(arylene ether) resin. Using proportions specified in the Table, epoxy resin EPON® 828 and plasticizer resorcinol diphosphate were charged into a flask with stirring. The solution was heated and as the temperature reached about 100° C., polyvinyl butyral (poly (vinyl butyral-co-polyvinyl alcohol-co-polyvinyl acetate) having a polyvinyl butyral content of about 88%, obtained as BUTVAR® B76 from Solutia) was added; the polyvinyl butyral appeared to dissolve completely as the temperature reached about 150° C. As the temperature reached about 160° C., poly(arylene ether) (directly isolated poly(2,6-dimethylphenyl ether), intrinsic viscosity 0.30 dL/g at 25° C. in chloroform; prepared and isolated according to known techniques for oxidative coupling of 2,6-xylenol; see, for example, U.S. Pat. No. 3,306,875 to Hay) was added. As the temperature reached about 200° C., a solution formed. As the solution was cooled to about 80° C., the homogeneous solution became a slurry of finely dispersed particles. At 80° C., MDEA was added and with its addition the slurry became a solution. Molding and property evaluation were conducted as described in Comparative Example 1. Results are presented in the Table. It should be noted that it is not possible to prepare corresponding comparative examples lacking a compatibilizing agent. In the absence of a compatibilizing agent, cooling the poly(arylene ether)/polyepoxide solution to 80° C. results in sudden precipitation of the poly(arylene ether) as a viscous mass, rather than formation of a slurry of finely dispersed particles.

EXAMPLE 3

This example illustrates preparation of a composition using a solid concentrate of poly(arylene ether) and epoxy resin. Fifty weight parts each of EPON® 828 and poly (arylene ether) (directly isolated poly(2,6-dimethylphenyl ether) having an intrinsic viscosity of 0.40 dL/g as measured in chloroform at 25° C.; obtained as NORYL® 640-111 from GE Plastics) and 0.5 parts Bisphenol A from Shell Chemical were charged into a vessel containing toluene to form an approximately 40% solids solution. After stirring and heating at 95° C. for one hour, the poly(arylene ether) was completely dissolved, and 0.677 parts 75% benzoyl peroxide stabilized with water (obtained from Catalyst Systems, Inc.) was added to redistribute the poly(phenylene ether) and lower its intrinsic viscosity to 0.30 dL/g. The toluene was removed to yield a solid concentrate consisting of approximately equal weight parts of polyepoxide and redistributed poly(phenylene ether) having an intrinsic viscosity of 0.30 dL/g. This powder was used as the sole source of poly(arylene ether) in a thermosetting composition comprising 15 parts by weight poly(arylene ether), 80 parts by weight EPON® 828, and 5 parts by weight polyvinyl butyral. The thermosetting composition was prepared by combining 30 parts of the above solid concentrate with 65 parts EPON® 828 and 5 parts polyvinyl butyral in a flask and heating at 200° C. with stirring until the powder dissolved. The resulting solution was cooled to about 80° C. yielding a fine precipitate of poly(arylene ether); addition of MDEA was accompanied by dissolution of the poly(arylene ether) precipitate and formation of a solution. Molding and property evaluation were conducted as described in Comparative Example 1. Results are presented in the Table. This example demonstrates an alternative technique for easily incorporating poly(arylene ether) into a thermosetting resin matrix.

EXAMPLE 4

The procedure of Example 3 was followed, except that the powdered concentrate was prepared and used as a 67:33 weight/weight ratio of redistributed poly(arylene ether) and polyepoxide. Results are presented in the Table.

TABLE

|  | C. Ex. 1 | Ex. 1 | Ex. 2 | Ex. 3 | Ex. 4 |
|---|---|---|---|---|---|
| COMPOSITION | | | | | |
| PPE (0.30IV) | — | 9.5 | 15 | — | — |
| PPE as a 50:50 PPE/Epoxy composition | — | — | — | 15 | — |
| PPE as a 67:33 PPE/Epoxy composition | — | — | — | — | 15 |
| EPON ® 828 | 100 | 85 | 78 | 65 | 72 |
| EPON ® 828 a 50:50 PPE/Epoxy composition | — | — | — | 15 | — |
| EPON ® 828 as a 67:33 PPE/Epoxy composition | — | — | — | — | 8 |
| Polyvinyl Butyral | — | 5.5 | 5 | 5 | 5 |
| Resorcinol Diphosphate (pbw per 100 pbw PPE) | — | 11 | 13 | — | 7 |
| Methylene-bis-diethyl aniline (pbw per 100 pbw EPON ® 828) | 46 | 41 | 46 | 46 | 46 |
| PROPERTIES | | | | | |
| Molded part thickness (mm) | 2.688 | 2.976 | 3.717 | 3.136 | 2.611 |
| $T_g$ (° C.) | 137/156 | 145/207 | 142/187 | 141/207 | 145/203 |
| Z-axis expansion, 30-260° C., neat resin bar (%) | 3.05 | 3.46 | 3.52 | 3.18 | 3.50 |
| $K_1C$ fracture toughness (MPa-m$^{1/2}$) | 0.75 | — | 0.97 | 1.10 | 0.99 |

The results show that Examples 1-4 provide higher fracture toughness than Comparative Example 1.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents and other references are incorporated herein by reference.

What is claimed is:

1. A method of forming a poly(arylene ether)-containing solid concentrate, comprising:
   blending about 30 to about 86 parts by weight of a poly(arylene ether), about 10 to about 70 parts by weight of a thermosetting resin, and about 4 to about 8 parts by weight of a compatibilizing agent in the presence of a solvent to form a homogeneous solution; and
   substantially removing the solvent to yield a solid concentrate;
   wherein the solid concentrate consists of the poly(arylene ether), the thermosetting resin, the compatibilizing agent, and any residual solvent;
   wherein the parts by weight of the poly(arylene ether), the thermosetting resin, and the compatibilizing agent sum to 100.

2. The method of claim 1, wherein the poly(arylene ether) comprises a plurality of structural units of the formula

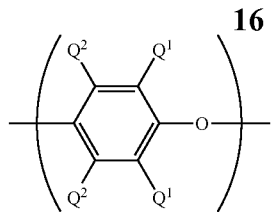

wherein for each structural unit, each $Q^1$ is independently halogen, primary or secondary $C_1$-$C_7$ alkyl, phenyl, $C_1$-$C_7$ haloalkyl, $C_1$-$C_7$ aminoalkyl, $C_1$-$C_7$ hydrocarbonoxy, or $C_2$-$C_7$ halohydrocarbonoxy wherein at least two carbon atoms separate the halogen and oxygen atoms; and each $Q^2$ is independently hydrogen, halogen, primary or secondary $C_1$-$C_7$ alkyl, phenyl, $C_1$-$C_7$ haloalkyl, $C_1$-$C_7$ aminoalkyl, $C_1$-$C_7$ hydrocarbonoxy, or $C_2$-$C_7$ halohydrocarbonoxy wherein at least two carbon atoms separate the halogen and oxygen atoms.

3. The method of claim 1 wherein the poly(arylene ether) is a homopolymer comprising 2,6-dimethyiphenylene ether units, or a random copolymer comprising 2,6-dimethyiphenylene ether units in combination with 2,3,6-trimethyl-1,4-phenylene ether units.

4. The method of claim 1, wherein the poly(arylene ether) comprises a redistributed poly(arylene ether).

5. The method of claim 1, wherein the poly(arylene ether) has an intrinsic viscosity of about 0.20 to about 0.40 deciliter/gram as measured at 25° C. in chloroform.

6. The method of claim 1, wherein the poly(arylene ether) has a number average molecular weight of about 15,000 to 25,000 atomic mass units.

7. The method of claim 1, wherein the poly(arylene ether) has a number average molecular weight of about 8,000 to 13,000 atomic mass units.

8. The method of claim 1, wherein the thermosetting resin is selected from the group consisting of epoxy resins, polyester resins, polyimide resins, bis-maleimide resins, cyanate ester resins, vinyl resins, benzoxazine resins, benzocyclobutene resins, and mixtures comprising at least one of the foregoing thermosetting resins.

9. The method of claim 1, wherein the thermosetting resin comprises an epoxy resin.

10. The method of claim 1, wherein the thermo setting resin comprises a reaction product of 2,2-bis(4-hydroxyphenyl)propane and epichlorohydrin.

11. The method of claim 1, wherein the solvent is selected from the group consisting of alcohols, ketones, aliphatic hydrocarbons, aromatic hydrocarbons, chlorohydrocarbons, nitrohydrocarbons, ethers, esters, amides, mixed ether-esters, sulfoxides, and mixtures thereof.

12. The method of claim 1, wherein the solvent is selected from the group consisting of benzene, toluene, and xylenes.

13. The method of claim 1, wherein said substantially removing the suitable solvent comprises removing at least 95 weight percent of the solvent.

14. The method of claim 1, wherein the compatibilizing agent is selected from the group consisting of polyvinyl acetal resins, styrene-butadiene-styrene block copolymers, styrene ethylene styrene block copolymers, styrene-ethylene-butylene-styrene block copolymers, functionalized butadiene-acrylonitrile copolymers, styrene-butadiene core shell rubbers, styrene-butadiene-styrene core shell rubbers, and mixtures thereof.

15. The method of claim 14, wherein the compatibilizing agent comprises a polyvinyl acetal.

16. The method of claim 1, wherein the homogeneous solution consists of the poly(arylene ether), the thermosetting resin, the compatibilizing agent, and the solvent.

17. A method of forming a poly(arylene ether)-containing solid concentrate, comprising:

blending about 30 to about 76 parts by weight of a poly(arylene ether), about 20 to about 70 parts by weight of a thermosetting resin, and about 4 to about 6 parts by weight of a compatibilizing agent in the presence of a solvent to form a homogeneous solution; and removing at least 95 weight percent of the solvent to yield a solid concentrate;

wherein the parts by weight of the poly(arylene ether), the thermosetting resin, and the compatibilizing agent sum to 100;

wherein the poly(arylene ether) is a homopolymer comprising 2,6-dimethylphenylene ether units, or a random copolymer comprising 2,6-dimethylphenylene ether units in combination with 2,3,6-trimethyl-1,4-phenylene ether units;

wherein the thermosetting resin comprises an epoxy resin;

wherein the compatibilizing agent comprises a polyvinyl acetal;

wherein the homogeneous solution consists of the poly(arylene ether), the thermosetting resin, the compatibilizing agent, and the solvent; and wherein the solid concentrate consists of the poly(arylene ether), the thermosetting resin, the compatibilizing agent, and any residual solvent.

* * * * *